(12) United States Patent
Kosegaki et al.

(10) Patent No.: US 12,391,236 B2
(45) Date of Patent: Aug. 19, 2025

(54) PARKING ASSISTANCE APPARATUS, PARKING ASSISTANCE METHOD, AND PROGRAM

(71) Applicant: AISIN CORPORATION, Aichi (JP)

(72) Inventors: Yoshihiko Kosegaki, Kariya (JP); Kazuma Iwazawa, Kariya (JP)

(73) Assignee: AISIN CORPORATION, Aichi (JP)

( * ) Notice: Subject to any disclaimer, the term of this patent is extended or adjusted under 35 U.S.C. 154(b) by 562 days.

(21) Appl. No.: 17/485,627

(22) Filed: Sep. 27, 2021

(65) Prior Publication Data

US 2022/0097687 A1 Mar. 31, 2022

(30) Foreign Application Priority Data

Sep. 29, 2020 (JP) ................. 2020-163494

(51) Int. Cl.
*B60W 30/06* (2006.01)
*B60W 10/04* (2006.01)
*B60W 10/18* (2012.01)
*B60W 40/11* (2012.01)
*B60W 40/112* (2012.01)

(52) U.S. Cl.
CPC ............ *B60W 30/06* (2013.01); *B60W 10/04* (2013.01); *B60W 10/18* (2013.01); *B60W 40/11* (2013.01); *B60W 40/112* (2013.01); *B60W 2520/16* (2013.01); *B60W 2520/18* (2013.01)

(58) Field of Classification Search
CPC ...... B60W 30/06; B60W 10/04; B60W 10/18; B60W 40/11; B60W 40/112; B60W 2520/16; B60W 2520/18
USPC ........................................................ 701/25
See application file for complete search history.

(56) References Cited

U.S. PATENT DOCUMENTS

| | | | |
|---|---|---|---|
| 2010/0235053 A1* | 9/2010 | Iwakiri | ............... B62D 15/027 701/41 |
| 2015/0375680 A1* | 12/2015 | Watanabe | ................. G06T 3/60 701/36 |
| 2016/0059700 A1* | 3/2016 | Watanabe | .............. B60K 35/00 348/333.02 |
| 2016/0159397 A1* | 6/2016 | Baek | ..................... B60W 30/06 701/41 |
| 2017/0032679 A1* | 2/2017 | Tomozawa | ........... B62D 15/028 |

(Continued)

*Primary Examiner* — Dino Kujundzic
(74) *Attorney, Agent, or Firm* — Sughrue Mion, PLLC

(57) ABSTRACT

A parking assistance apparatus includes: a route calculation unit configured to calculate a movement route for moving a vehicle to a parking target position; an inclination angle calculation unit configured to calculate first inclination angle information, calculate second inclination angle information by performing a filtering process, and when there is a deviation between the first inclination angle information and the second inclination angle information, reset the first inclination angle information used in the filtering process and calculate the second inclination angle information by performing the filtering process using first inclination angle information calculated after the resetting; and a movement control unit configured to execute movement control for controlling a driving force and a braking force to move the vehicle to the parking target position along the movement route, while adjusting the driving force and the braking force according to the second inclination angle information.

6 Claims, 8 Drawing Sheets

(56) References Cited

U.S. PATENT DOCUMENTS

| | | | | |
|---|---|---|---|---|
| 2017/0137061 A1* | 5/2017 | Azuma | ................ | B62D 15/021 |
| 2018/0186365 A1* | 7/2018 | Kim | ...................... | B60W 30/06 |
| 2018/0345955 A1* | 12/2018 | Kim | ...................... | B60Q 1/346 |
| 2018/0356218 A1* | 12/2018 | Omachi | ................ | B60W 30/00 |
| 2020/0298832 A1* | 9/2020 | Maeda | ............... | B62D 15/0285 |

\* cited by examiner

PARKING ASSISTANCE APPARATUS, PARKING ASSISTANCE METHOD, AND PROGRAM

CROSS REFERENCE TO RELATED APPLICATIONS

This application is based on and claims priority under 35 U.S.C. § 119 to Japanese Patent Application 2020-163494, filed on Sep. 29, 2020, the entire content of which is incorporated herein by reference.

TECHNICAL FIELD

This disclosure relates to a parking assistance apparatus, a parking assistance method, and a program.

BACKGROUND DISCUSSION

In related art, as a parking assistance technique, there has been known a technique in which when control for moving a vehicle to a parking target position is performed, a driving force and a braking force applied to the vehicle is adjusted according to an inclination angle with respect to the ground on which the vehicle travels.

However, for example, when information on the inclination angle with respect to the ground detected in the vehicle includes noise of a high frequency component, recognition of the inclination angle is delayed since a filtering process of removing the noise is performed. In this case, there are problems that when, for example, the parking target position is immediately after a change from an uphill slope to a downhill slope, a speed of the vehicle immediately before the parking target position becomes higher than expected, and sudden braking is required to stop the vehicle at the parking target position.

A need thus exists for a parking assistance apparatus, a parking assistance method, and a program which are not susceptible to the drawback mentioned above.

SUMMARY

According to an aspect of this disclosure, for example, a parking assistance apparatus includes: a route calculation unit configured to calculate a movement route for moving a vehicle from a current position of the vehicle to a parking target position; an inclination angle calculation unit configured to calculate first inclination angle information, which is information indicating an inclination angle with respect to the ground on which the vehicle travels, in a chronological order, calculate second inclination angle information by performing a filtering process of removing a high frequency component equal to or higher than a predetermined threshold value on waveform information represented by arranging a plurality of pieces of the calculated first inclination angle information in a chronological order, and when it is determined that there is a deviation between the first inclination angle information and the second inclination angle information based on a predetermined reference, reset the plurality of pieces of the first inclination angle information used in the filtering process and calculate the second inclination angle information by performing the filtering process using a plurality of pieces of the first inclination angle information calculated after the resetting; and a movement control unit configured to execute movement control for controlling a driving force and a braking force on the vehicle to move the vehicle to the parking target position along the movement route, while adjusting the driving force and the braking force according to the second inclination angle information.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described. Configurations of the embodiments described below and actions, results, and effects provided by this configuration are examples. This disclosure can be implemented by configurations other than those disclosed in the following embodiment, and at least one of various effects based on the basic configuration and derived effects can be obtained.

Figure 1:
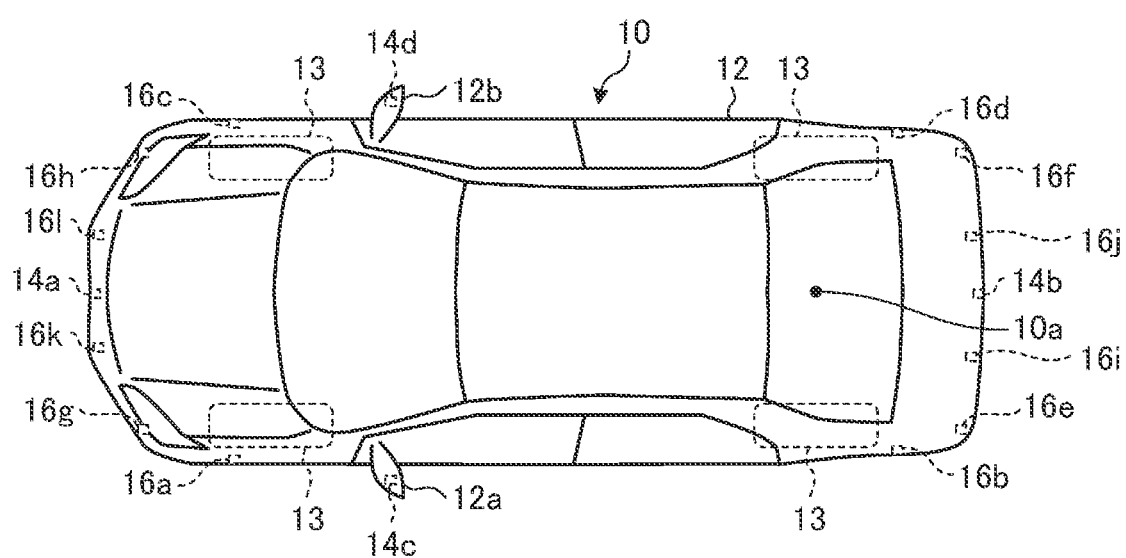
FIG. 1 is a plan view of a vehicle on which a parking assistance system according to an embodiment is mounted.

FIG. 1 is a plan view of a vehicle 10 on which a parking assistance system 20 (FIG. 2) according to an embodiment is mounted. The vehicle 10 may be, for example, an automobile that uses an internal combustion engine (engine, not shown) as a drive source (internal combustion engine automobile), an automobile that uses an electric motor (motor, not shown) as the drive source (electric automobile, fuel cell automobile or the like), or an automobile that uses both the internal combustion engine and the electric motor as the drive source (hybrid automobile). The vehicle 10 can mount various transmission devices, and can also mount various devices (system, component, and the like) necessary for driving the internal combustion engine or the electric motor. A method, the number, a layout, and the like of the device related to driving wheels 13 in the vehicle 10 can be set in various ways.

As shown in FIG. 1, the vehicle 10 includes a vehicle body 12, four wheels 13, four imaging units 14a to 14d, and twelve distance measuring units 16a to 16l. Hereinafter, when it is not necessary to distinguish the imaging units 14a to 14d, the imaging units 14a to 14d are referred to as the imaging unit 14. When it is not necessary to distinguish the distance measuring units 16a to 16l, the distance measuring units 16a to 16l are referred to as the distance measuring unit 16.

The vehicle body 12 constitutes a vehicle compartment where an occupant gets on. The vehicle body 12 accommodates or holds the wheels 13, the imaging unit 14, the distance measuring unit 16, and the like.

The four wheels 13 are provided on the front, rear, left, and right sides of the vehicle body 12. For example, the two front wheels 13 function as turning wheels, and the two rear wheels 13 function as driving wheels.

The imaging unit 14 is, for example, a digital camera including an imaging element such as a charge coupled device (CCD) or a CMOS image sensor (CIS). The imaging unit 14 outputs data of moving images including a plurality of frame images generated at a predetermined frame rate or a still image as data of a captured image.

The distance measuring unit 16 is, for example, a sonar that is provided at an outer peripheral portion of the vehicle 10, transmits a sound wave or the like including an ultrasonic wave as a detection wave, and captures the detection wave reflected by an object such as another vehicle present around the vehicle 10. The distance measuring unit 16 may be a radar, a millimeter wave radar, or the like that outputs a detection wave such as laser light.

Figure 2:
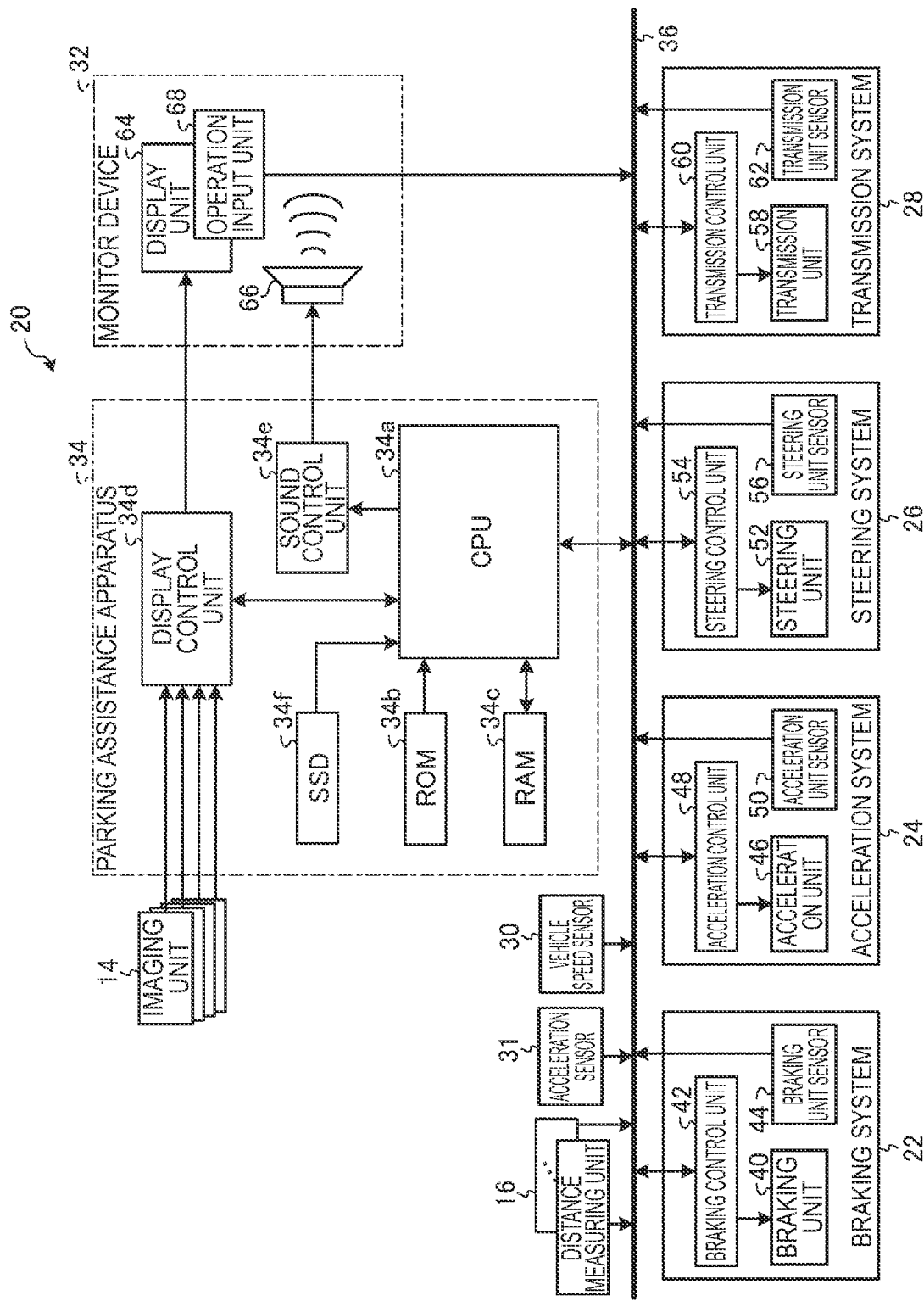
FIG. 2 is a block diagram showing an overall configuration of the parking assistance system according to the embodiment.

FIG. 2 is a block diagram showing an overall configuration of the parking assistance system 20 according to the embodiment. The parking assistance system 20 is mounted on the vehicle 10 and assists driving of the vehicle 10 by automatic driving (including partial automatic driving) according to an object around the vehicle 10.

As shown in FIG. 2, the parking assistance system 20 includes the imaging unit 14, the distance measuring unit 16, a braking system 22, an acceleration system 24, a steering system 26, a transmission system 28, a vehicle speed sensor 30, an acceleration sensor 31, a monitor device 32, a parking assistance apparatus 34, and an in-vehicle network 36.

The braking system 22 controls deceleration of the vehicle 10. The braking system 22 includes a braking unit 40, a braking control unit 42, and a braking unit sensor 44.

The braking unit 40 is a device that includes, for example, a brake, a brake pedal, and the like, and causes the deceleration of the vehicle 10.

The braking control unit 42 is, for example, a computer such as a microcomputer including a hardware processor such as a central processing unit (CPU). The braking control unit 42 controls the braking unit 40 to control the deceleration of the vehicle 10 based on an instruction from the parking assistance apparatus 34.

The braking unit sensor 44 is, for example, a position sensor, and detects a position of the braking unit 40 when the braking unit 40 is a brake pedal. The braking unit sensor 44 outputs the detected position of the braking unit 40 to the in-vehicle network 36.

The acceleration system 24 controls acceleration of the vehicle 10. The acceleration system 24 includes an acceleration unit 46, an acceleration control unit 48, and an acceleration unit sensor 50.

The acceleration unit 46 is a device that includes, for example, an accelerator pedal, and causes the acceleration of the vehicle 10.

The acceleration control unit 48 is, for example, a computer such as a microcomputer including a hardware processor such as a CPU. The acceleration control unit 48 controls the acceleration unit 46 to control the acceleration of the vehicle 10 based on an instruction from the parking assistance apparatus 34.

The acceleration unit sensor 50 is, for example, a position sensor, and detects a position of the acceleration unit 46 when the acceleration unit 46 is an accelerator pedal. The acceleration unit sensor 50 outputs the detected position of the acceleration unit 46 to the in-vehicle network 36.

The steering system 26 controls a traveling direction of the vehicle 10. The steering system 26 includes a steering unit 52, a steering control unit 54, and a steering unit sensor 56.

The steering unit 52 is a device that includes, for example, a handle or a steering wheel, and turns the turning wheels of the vehicle 10 to steer the traveling direction of the vehicle 10.

The steering control unit 54 is, for example, a computer such as a microcomputer including a hardware processor such as a CPU. The steering control unit 54 controls the steering unit 52 to control the traveling direction of the vehicle 10 based on an instruction from the parking assistance apparatus 34.

The steering unit sensor 56 is, for example, an angle sensor including a Hall element or the like, and detects a steering angle that is a rotation angle of the steering unit 52. The steering unit sensor 56 outputs the detected steering angle of the steering unit 52 to the in-vehicle network 36.

The transmission system 28 controls a transmission ratio of the vehicle 10. The transmission system 28 includes a transmission unit 58, a transmission control unit 60, and a transmission unit sensor 62.

The transmission unit 58 is a device that includes, for example, a shift lever, and changes the transmission ratio of the vehicle 10.

The transmission control unit 60 is, for example, a computer such as a microcomputer including a hardware processor such as a CPU. The transmission control unit 60 controls the transmission unit 58 to control the transmission ratio of the vehicle 10 based on an instruction from the parking assistance apparatus 34.

The transmission unit sensor 62 is, for example, a position sensor, and detects a position of the transmission unit 58 when the transmission unit 58 is a shift lever. The transmission unit sensor 62 outputs the detected position of the transmission unit 58 to the in-vehicle network 36.

The vehicle speed sensor 30 is, for example, a sensor that includes a Hall element provided near the wheel 13 of the vehicle 10 and detects a rotation amount of the wheel 13 or the number of rotations per unit time. The vehicle speed sensor 30 outputs a wheel speed pulse number indicating the detected rotation amount or the number of rotations to the in-vehicle network 36 as a sensor value for calculating a vehicle speed. The parking assistance apparatus 34 can calculate a speed (vehicle speed), a movement amount, and the like of the vehicle 10 based on the sensor value acquired from the vehicle speed sensor 30.

The acceleration sensor 31 is, for example, an electrostatic capacitance three-axis acceleration sensor, and detects acceleration caused by gravity acceleration, the acceleration or the deceleration of the vehicle 10, or the like. The acceleration sensor 31 outputs an acceleration signal indicating a detection result. The parking assistance apparatus 34 can calculate an inclination angle with respect to the ground on which the vehicle 10 travels based on, for example, the acceleration signal acquired from the acceleration sensor 31.

The monitor device 32 is provided on a dashboard or the like in the vehicle compartment of the vehicle 10. The monitor device 32 includes a display unit 64, a sound output unit 66, and an operation input unit 68.

The display unit 64 displays an image based on image data transmitted from the parking assistance apparatus 34. The display unit 64 is, for example, a display device such as a liquid crystal display (LCD) or an organic electroluminescent display (OELD). The display unit 64 displays, for example, an image indicating reception of an operation instruction for instructing switching between the automatic driving and manual driving.

The sound output unit 66 outputs a sound based on sound data transmitted from the parking assistance apparatus 34. The sound output unit 66 is, for example, a speaker. The sound output unit 66 outputs, for example, a sound related to the operation instruction for instructing the switching between the automatic driving and the manual driving.

The operation input unit 68 receives an input from an occupant. The operation input unit 68 is, for example, a touch panel. The operation input unit 68 is provided on a display screen of the display unit 64. The operation input unit 68 is configured to transmit the image displayed by the display unit 64. Accordingly, the operation input unit 68 allows the occupant to visually recognize the image displayed on the display screen of the display unit 64. The operation input unit 68 receives an instruction input by the occupant touching a position corresponding to the image displayed on the display screen of the display unit 64, and transmits the instruction to the parking assistance apparatus 34. The operation input unit 68 is not limited to a touch panel, and may be a push button type hard switch, or other type of hard switch.

The parking assistance apparatus 34 is a computer including a microcomputer such as an electronic control unit (ECU), and performs parking assistance of the vehicle 10.

The parking assistance apparatus 34 includes a CPU 34a, a read only memory (ROM) 34b, a random access memory (RAM) 34c, a display control unit 34d, a sound control unit 34e, and a solid state drive (SSD) 34f. The CPU 34a, the ROM 34b, and the RAM 34c may be integrated in a same package.

The CPU 34a is an example of a hardware processor, reads a program stored in a nonvolatile storage device such as the ROM 34b, and executes various calculation processing and control according to the program. For example, the CPU 34a executes the parking assistance by the automatic driving of the vehicle 10.

The ROM 34b stores programs, parameters necessary for executing each program, and the like. The RAM 34c temporarily stores various data used in the calculation in the CPU 34a. Among the calculation processing in the parking assistance apparatus 34, the display control unit 34d mainly executes image processing of an image captured by the imaging unit 14, data conversion of a display image to be displayed on the display unit 64, and the like. Among the calculation processing in the parking assistance apparatus 34, the sound control unit 34e mainly executes processing of a sound to be output to the sound output unit 66. The SSD 34f is a rewritable nonvolatile storage device, and maintains data even when the parking assistance apparatus 34 is powered off.

The in-vehicle network 36 includes, for example, a controller area network (CAN), and a local interconnect network (LIN). The in-vehicle network 36 connects the acceleration system 24, the braking system 22, the steering system 26, the transmission system 28, the distance measuring unit 16, the vehicle speed sensor 30, the acceleration sensor 31, the operation input unit 68 of the monitor device 32, and the parking assistance apparatus 34 so as to be able to transmit and receive information to and from each other.

Figure 3:
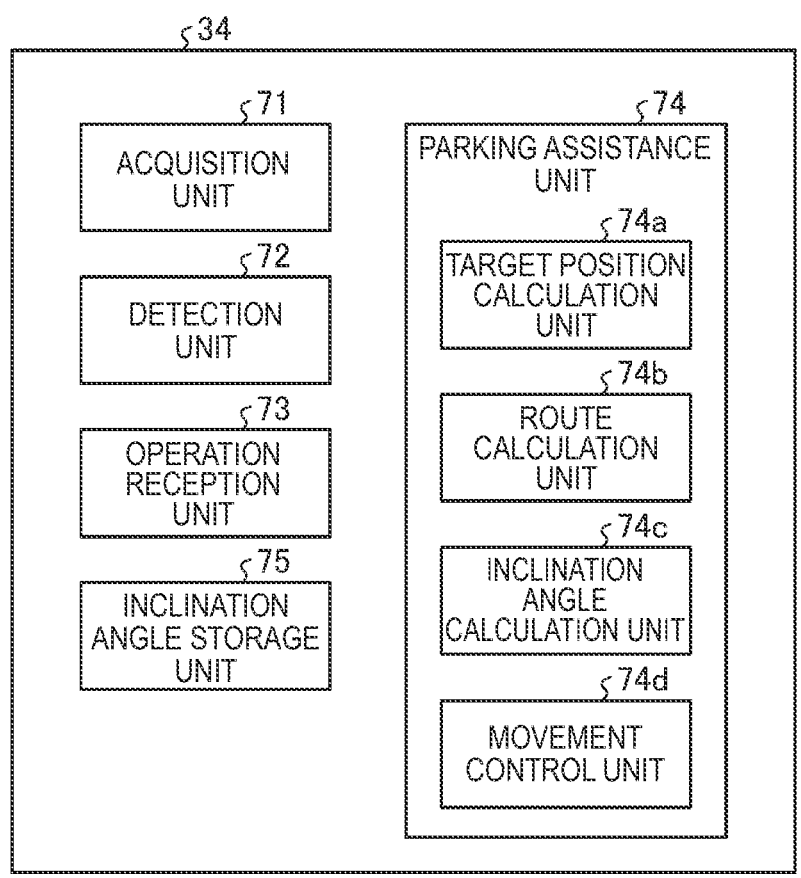
FIG. 3 is a functional block diagram illustrating functions of a parking assistance apparatus according to the embodiment.

FIG. 3 is a functional block diagram illustrating functions of the parking assistance apparatus 34. As shown in FIG. 3, the parking assistance apparatus 34 includes an acquisition unit 71, a detection unit 72, an operation reception unit 73, a parking assistance unit 74, and an inclination angle storage unit 75. The parking assistance unit 74 includes a target position calculation unit 74a, a route calculation unit 74b, an inclination angle calculation unit 74c, and a movement control unit 74d.

The acquisition unit 71, the detection unit 72, the operation reception unit 73, and the parking assistance unit 74 are implemented by the CPU 34a reading and executing a program (parking program) stored in a storage device such as the ROM 34b. Some or all of the acquisition unit 71, the detection unit 72, the operation reception unit 73, and the parking assistance unit 74 may be formed of hardware such as a circuit including an application specific integrated circuit (ASIC). The inclination angle storage unit 75 is implemented by, for example, a storage unit such as the RAM 34c.

The acquisition unit 71 acquires sensor values from various sensors and acquires captured image data from the imaging unit 14.

The detection unit 72 detects obstacles, parking areas, and the like around the vehicle 10 based on surrounding information (sensor values, captured image data, and the like) acquired by the acquisition unit 71.

The operation reception unit 73 acquires (receives) a signal from the operation input unit 68 according to an operation performed on the operation input unit 68.

The parking assistance unit 74 calculates a parking target position and a movement route by the automatic driving of the vehicle 10 implemented by controlling all or a part of the systems 22, 24, 26, and 28, and moves the vehicle 10 to the parking target position along the movement route. That is, the parking assistance unit 74 assists parking of the vehicle 10.

The target position calculation unit 74a calculates (determines) a movement target position, in other words, the parking target position, of the vehicle 10 as a guide or a target position for guiding the vehicle 10 by a known method or the like, based on a detection result of the detection unit 72, for example. The parking target position may be an end of the movement route or may be in the middle of the movement route. The parking target position may be set as, for example, a point, a line, a frame, a region, or the like.

The route calculation unit 74b calculates the movement route for moving the vehicle 10 from a current position of the vehicle 10 to the parking target position by a known method or the like.

For example, the inclination angle calculation unit 74c calculates first inclination angle information, which is information indicating an inclination angle with respect to the ground on which the vehicle 10 travels, in a chronological order based on the acceleration signal acquired from the acceleration sensor 31. In addition, the inclination angle calculation unit 74c calculates second inclination angle information by performing a filtering process (for example, a low-pass filter (LPF) process, an averaging filtering process, or the like) that removes a high frequency component equal to or higher than a predetermined threshold value on waveform information represented by arranging a plurality of pieces of calculated first inclination angle information in a chronological order.

In addition, the inclination angle calculation unit 74c determines whether there is a deviation between the first inclination angle information and the second inclination angle information based on a predetermined reference. The determination of the deviation may be performed based on, for example, whether a difference between instantaneous values of the first inclination angle information and the second inclination angle information is equal to or greater than a predetermined difference threshold value, but this disclosure is not limited thereto. When the inclination angle calculation unit 74c determines that there is a deviation, the inclination angle calculation unit 74c resets (deletes) the plurality of pieces of the first inclination angle information used in the filtering process, and performs the filtering process by using a plurality of pieces of the first inclination angle information calculated after the resetting to calculate the second inclination angle information.

When a time period in which the inclination angle calculation unit 74c determines that there is a deviation between the first inclination angle information and the second inclination angle information based on the predetermined reference continues for a predetermined time period or longer, the inclination angle calculation unit 74c may reset the plurality of pieces of the first inclination angle information used in the filtering process.

In order to move the vehicle 10 to the parking target position along the movement route, the movement control unit 74d controls all or a part of the systems 22, 24, 26, and 28 to execute movement control for controlling a driving force and a braking force on the vehicle 10. When the movement control unit 74d executes the movement control, the movement control unit 74d adjusts the driving force and the braking force according to the second inclination angle information. For example, when the second inclination angle information indicates an uphill slope, the movement control unit 74d increases the driving force according to the second inclination angle information. For example, when the second inclination angle information indicates a downhill slope, the movement control unit 74d increases the braking force according to the second inclination angle information.

When the inclination angle calculation unit 74c resets the plurality of pieces of the first inclination angle information used in the filtering process, the movement control unit 74d may execute the movement control by using the first inclination angle information instead of the second inclination angle information until the inclination angle calculation unit 74c starts calculating the second inclination angle information after the resetting.

Figure 4:
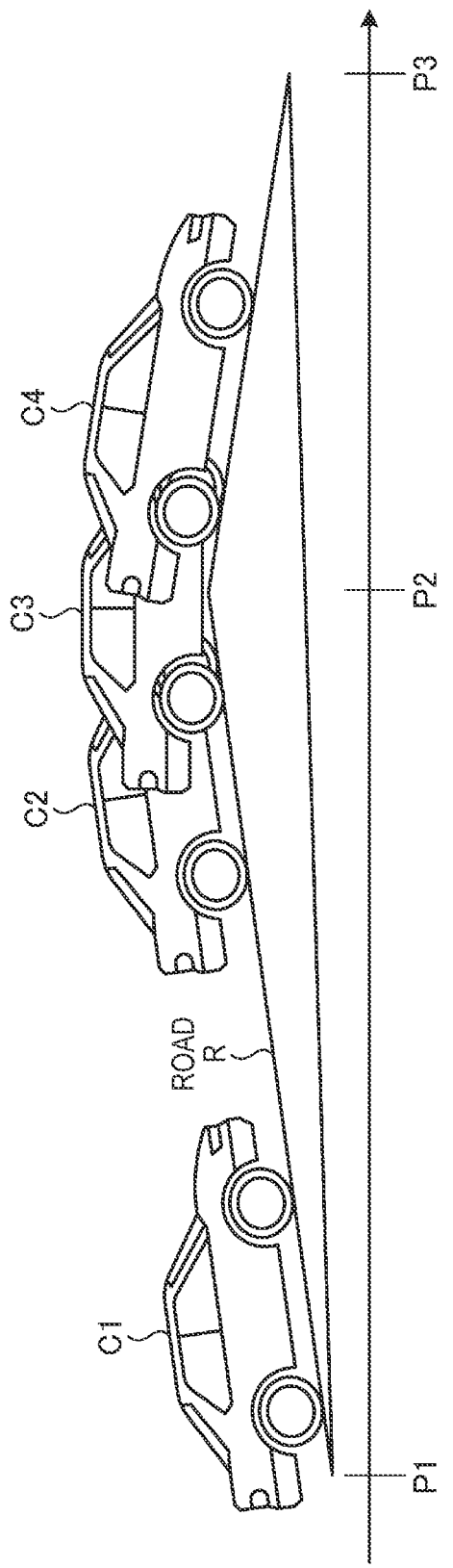
FIG. 4 is a diagram showing an example of an inclination of a road at the time of performing parking assistance according to the embodiment.
Figure 5:
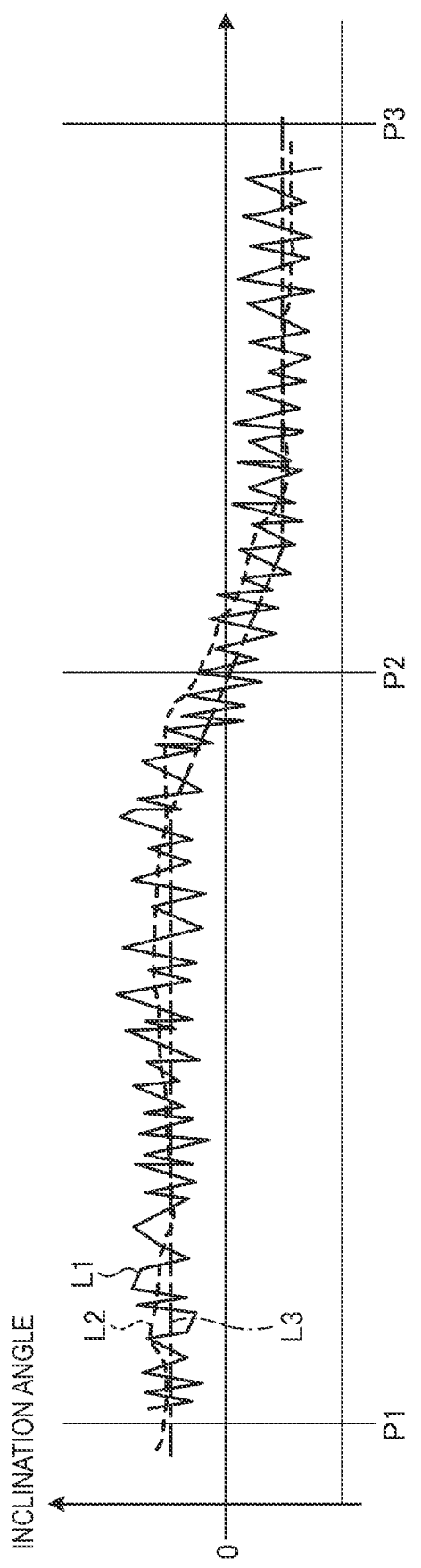
FIG. 5 is a graph related to inclination angles during parking assistance according to a comparative example.
Figure 6:
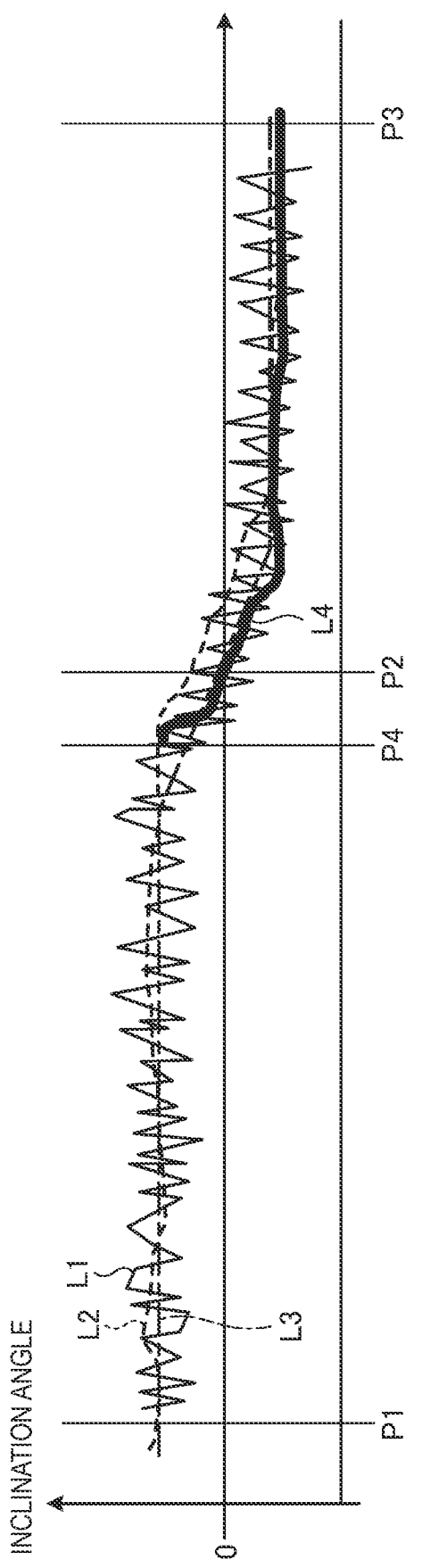
FIG. 6 is a graph related to inclination angles during the parking assistance according to the embodiment.

Next, how the inclination angle information changes during the parking assistance will be described with reference to FIGS. 4 to 6. FIG. 4 is a diagram showing an example of an inclination of a road at the time of performing the parking assistance according to the embodiment. FIG. 5 is a graph related to inclination angles during the parking assistance according to a comparative example. FIG. 6 is a graph related to inclination angles during the parking assistance according to the embodiment.

As shown in FIG. 4, when the vehicle travels in a right direction on a paper surface, a region between points P1 and P2 is an uphill slope, and a region between points P2 and P3 is a downhill slope. Here, it is assumed that a vehicle position of C1 is a parking assistance start point, and a vehicle position of C4 is a parking assistance end point (that is, the parking target position).

When the vehicle position changes to C1, C2, C3, and C4, the inclination angles are recognized as shown in FIG. 5 in the comparative example (related art). Data L1 is data of the inclination angles calculated based on the acceleration signal from the acceleration sensor. Since the data L1 includes noise of a high frequency component, the filtering process for removing the noise is performed. Data L2 is data of the inclination angles after the filtering process is performed. Data L3 is a true value of the inclination angle.

As can be seen from a comparison between the data L2 and the data L3, when a road on which the vehicle travels changes from the uphill slope to the downhill slope (near the point P2), the inclination angles (data L2) after the filtering process is performed delay with respect to the true values of the inclination angle (data L3). As a result, a speed of the vehicle immediately before the vehicle arrives the parking target position (C4) becomes higher than expected, and sudden braking is required to stop the vehicle at the parking target position, and thus, there is room for improvement.

According to the method of the embodiment disclosed here, the inclination angles are recognized as shown in FIG. 6. The data L1 and L2 are the same as those in FIG. 5. In the method of the embodiment disclosed here, the inclination angle that is indicated by the data L2 in FIG. 5 is obtained up to a point P4, but the inclination angle calculation unit 74c determines that there is a deviation between the data L2 and the data L1 at the point P4. Then, the inclination angle calculation unit 74c resets (deletes) the latest data L1 used in the filtering process, and performs the filtering process by using the data L1 calculated after the resetting to calculate data L4.

As can be seen from a comparison between the data L4 and the data L2, the data L4 is significantly earlier than the data L2, returns from the deviation, and follows the true value (data L3).

Figure 7:
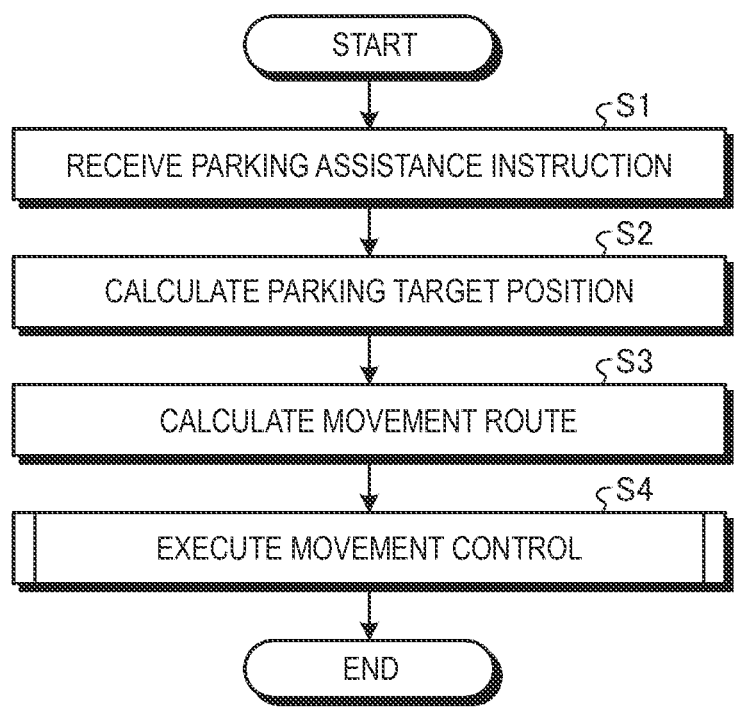
FIG. 7 is a flowchart of a parking assistance process executed by the parking assistance apparatus according to the embodiment.

Next, a parking assistance process executed by the parking assistance apparatus 34 according to the embodiment will be described with reference to FIG. 7. FIG. 7 is a flowchart of the parking assistance process executed by the parking assistance apparatus 34 according to the embodiment.

In step S1, when the operation reception unit 73 receives a parking assistance instruction or the like from an occupant via the operation input unit 68, the target position calculation unit 74a calculates the parking target position based on the detection result from the detection unit 72 in step S2.

Next, in step S3, the route calculation unit 74b calculates the movement route for moving the vehicle 10 from the current position of the vehicle 10 to the parking target position.

Next, in step S4, the movement control unit 76c executes the movement control for moving the vehicle 10 to the parking target position along the movement route.

Figure 8:
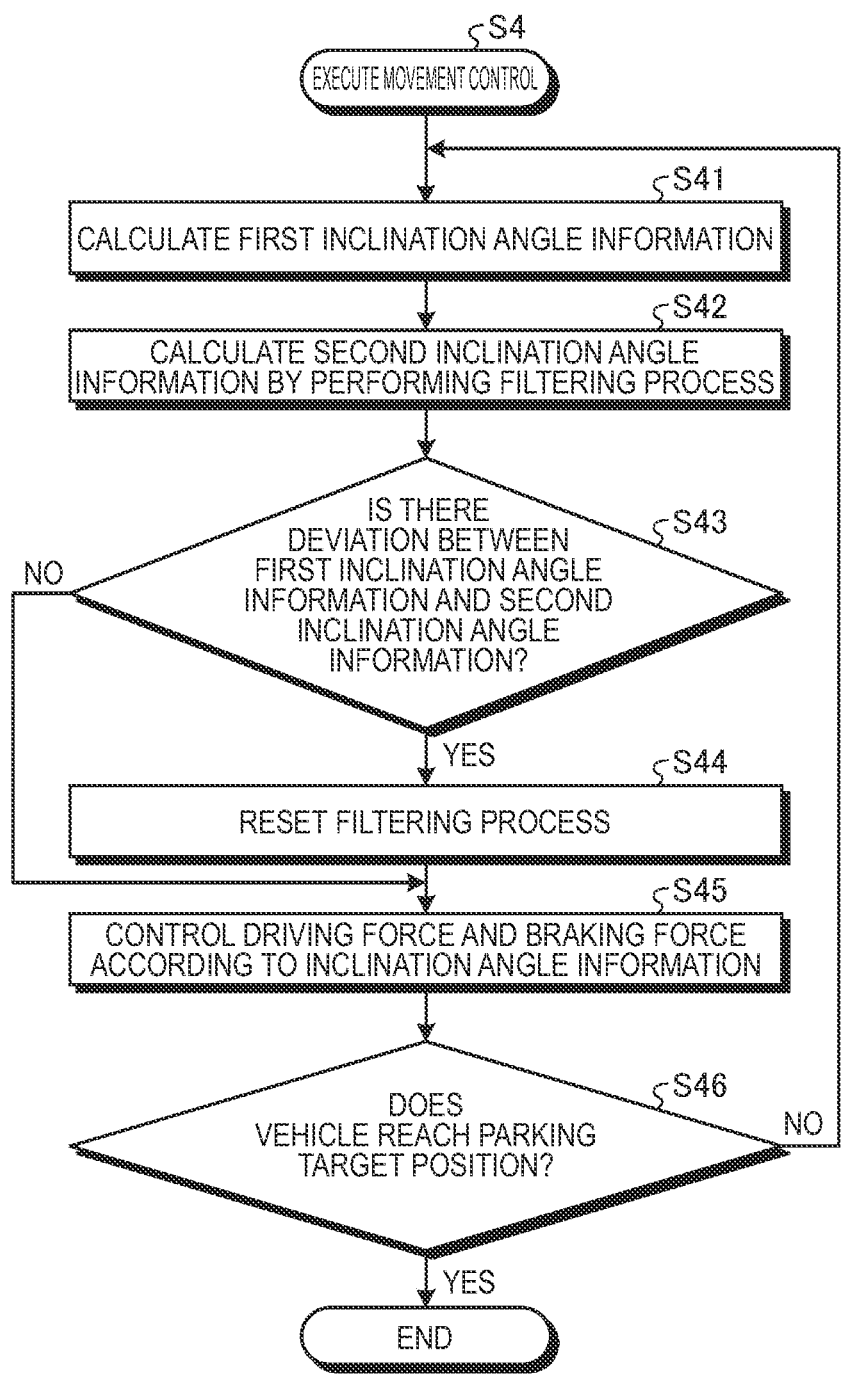
FIG. 8 is a flowchart showing details of processing of step S4 in FIG. 7.

Here, FIG. 8 is a flowchart showing details of the processing of step S4 in FIG. 7. In step S41, the inclination angle calculation unit 74c calculates the first inclination angle information (data L1 in FIG. 6), which is the information indicating the inclination angle with respect to the ground on which the vehicle 10 travels, in a chronological order based on the acceleration signal acquired from the acceleration sensor 31.

Next, in step S42, the inclination angle calculation unit 74c calculates the second inclination angle information (data L2 in FIG. 6) by performing the filtering process that removes the high frequency component equal to or higher than the predetermined threshold value on the waveform information represented by arranging a plurality of pieces of the first inclination angle information calculated in step S41 in a chronological order.

Next, in step S43, the inclination angle calculation unit 74c determines whether there is a deviation between the first inclination angle information and the second inclination angle information based on the predetermined reference. If Yes, the process proceeds to step S44. If No, the process proceeds to step S45.

In step S44, the inclination angle calculation unit 74c resets the plurality of pieces of the first inclination angle information used in the filtering process.

In step S45, in order to move the vehicle 10 to the parking target position along the movement route, the movement control unit 74d executes the movement control for controlling the driving force and the braking force on the vehicle 10, while adjusting the driving force and the braking force according to the second inclination angle information. For example, when the second inclination angle information indicates an uphill slope, the movement control unit 74d increases the driving force according to the second inclination angle information. For example, when the second inclination angle information indicates a downhill slope, the movement control unit 74d increases the braking force according to the second inclination angle information.

When the inclination angle calculation unit 74c resets the plurality of pieces of the first inclination angle information used in the filtering process, the movement control unit 74d may execute the movement control by using the first inclination angle information instead of the second inclination angle information until the inclination angle calculation unit 74c starts calculating the second inclination angle information after the resetting.

Next, in step S46, the movement control unit 74d determines whether the vehicle 10 has reached the parking target position. If Yes, the process of step S4 ends. If No, the process returns to step S41.

As described above, according to the parking assistance apparatus 34 of the first embodiment, when it is determined that there is a deviation between the first inclination angle information and the second inclination angle information, the plurality of pieces of the first inclination angle information used in the filtering process are reset, so that the second inclination angle information calculated thereafter can follow the true value more quickly. That is, it is possible to improve accuracy of recognition of the inclination angle with respect to the ground at the time of the parking assistance.

Therefore, for example, even when the parking target position is immediately after a change from an uphill slope to a downhill slope, it is possible to significantly reduce a possibility or degree that the vehicle becomes faster than expected immediately before arriving the parking target position, and it is possible to prevent a situation in which the sudden braking is required to stop the vehicle at the parking target position.

In addition, for example, by performing the resetting when a time period in which it is determined that there is a deviation continues for the predetermined time period or longer, it is possible to more reliably prevent error resetting.

In addition, for example, the movement control can be continuously executed by using the first inclination angle information instead of the second inclination angle information until calculation of the second inclination angle information is started after the resetting.

Modification

Next, a modification of the parking assistance apparatus 34 will be described. When the inclination angle calculation unit 74c resets the plurality of pieces of the first inclination angle information used in the filtering process, immediately after the resetting, the movement control unit 74d executes the movement control by using predetermined inclination angle information obtained based on the plurality of pieces of the first inclination angle information calculated immediately before the resetting.

Referring to FIG. 6, even when the data L2 deviates from the data L3 (true value) around the points P4 and P2, for example, an intermediate value between an upper peak value and a lower peak value in the data L1 is the true value. Therefore, immediately after the resetting, based on the plurality of pieces of the first inclination angle information calculated immediately before the resetting, the movement control unit 74d can acquire, for example, the intermediate value between the upper peak value and the lower peak value in the data L1 as the predetermined inclination angle information, and use the intermediate value for the movement control.

As described above, according to the parking assistance apparatus 34 of the modification, by using, immediately after the resetting, the predetermined inclination angle information (inclination angle information closer to the true value) obtained based on the plurality of pieces of the first inclination angle information acquired immediately before the resetting, it is possible to execute more appropriate movement control.

The predetermined inclination angle information is not limited to the intermediate value between the upper peak value and the lower peak value in the data L1 as described above, and for example, other values such as a value obtained by averaging the data L1 in a predetermined time period may be adopted.

The program for executing the above-described processes executed by the parking assistance apparatus 34 may be stored in a computer-readable storage medium such as a CD-ROM, a CD-R, a memory card, a digital versatile disk (DVD), or a flexible disk (FD) as a file in an installable format or an executable format and provided as a computer program product. Further, the program may be stored in a computer connected to a network such as the Internet and provided by being downloaded via the network. The program may be provided or distributed via a network such as the Internet.

According to an aspect of this disclosure, for example, a parking assistance apparatus includes: a route calculation unit configured to calculate a movement route for moving a vehicle from a current position of the vehicle to a parking target position; an inclination angle calculation unit configured to calculate first inclination angle information, which is information indicating an inclination angle with respect to the ground on which the vehicle travels, in a chronological order, calculate second inclination angle information by performing a filtering process of removing a high frequency component equal to or higher than a predetermined threshold value on waveform information represented by arranging a plurality of pieces of the calculated first inclination angle information in a chronological order, and when it is determined that there is a deviation between the first inclination angle information and the second inclination angle information based on a predetermined reference, reset the plurality of pieces of the first inclination angle information used in the filtering process and calculate the second inclination angle information by performing the filtering process using a plurality of pieces of the first inclination angle information calculated after the resetting; and a movement control unit configured to execute movement control for controlling a driving force and a braking force on the vehicle to move the vehicle to the parking target position along the movement route, while adjusting the driving force and the braking force according to the second inclination angle information.

According to the above-described parking assistance apparatus, for example, when it is determined that there is a deviation between the first inclination angle information and the second inclination angle information, the plurality of pieces of the first inclination angle information used in the filtering process are reset, so that the second inclination angle information calculated thereafter can follow the true value more quickly. That is, it is possible to improve accuracy of recognition of the inclination angle with respect to the ground at the time of the parking assistance.

In the above-described parking assistance apparatus, for example, when a time period in which it is determined that there is a deviation between the first inclination angle information and the second inclination angle information based on the predetermined reference continues for a predetermined time period or longer, the inclination angle calculation unit resets the plurality of pieces of the first inclination angle information used in the filtering process.

According to the above-described parking assistance apparatus, for example, by performing the resetting when a time period in which it is determined that there is a deviation continues for the predetermined time period or longer, it is possible to more reliably prevent error resetting.

In the above-described parking assistance apparatus, for example, when the inclination angle calculation unit resets the plurality of pieces of the first inclination angle information used in the filtering process, the movement control unit executes the movement control by using the first inclination angle information instead of the second inclination angle information until the inclination angle calculation unit starts calculating the second inclination angle information after the resetting.

According to the above-described parking assistance apparatus, for example, the movement control can be continuously executed by using the first inclination angle information instead of the second inclination angle information until the second inclination angle information starts to be calculated after the resetting.

In the above-described parking assistance apparatus, for example, when the inclination angle calculation unit resets the plurality of pieces of first inclination angle information used in the filtering process, immediately after the resetting, the movement control unit executes the movement control by using predetermined inclination angle information obtained based on the plurality of pieces of the first inclination angle information calculated by the inclination angle calculation unit immediately before the resetting.

According to the above-described parking assistance apparatus, for example, by obtaining, immediately after the resetting, the predetermined inclination angle information based on the plurality of pieces of the first inclination angle information calculated immediately before the resetting and using the predetermined inclination angle information, it is possible to execute more appropriate movement control.

According to an aspect of this disclosure, a parking assistance method includes: a route calculation step of calculating a movement route for moving a vehicle from a current position of the vehicle to a parking target position; an inclination angle calculation step of calculating first inclination angle information, which is information indicating an inclination angle with respect to the ground on which the vehicle travels, in a chronological order, calculating second inclination angle information by performing a filtering process of removing a high frequency component equal to or higher than a predetermined threshold value on waveform information represented by arranging a plurality of pieces of the calculated first inclination angle information in a chronological order, and when it is determined that there is a deviation between the first inclination angle information and the second inclination angle information based on a predetermined reference, resetting the plurality of pieces of the first inclination angle information used in the filtering process and calculating the second inclination angle information by performing the filtering process using a plurality of pieces of the first inclination angle information calculated after the resetting; and a movement control step of executing movement control for controlling a driving force and a braking force on the vehicle to move the vehicle to the parking target position along the movement route, while adjusting the driving force and the braking force according to the second inclination angle information.

According to the above-described parking assistance method, for example, when it is determined that there is a deviation between the first inclination angle information and the second inclination angle information, the plurality of pieces of the first inclination angle information used in the filtering process are reset, so that the second inclination angle information calculated thereafter can follow the true value more quickly.

According to an aspect of this disclosure, a program that causes a computer to function as: a route calculation unit configured to calculate a movement route for moving a vehicle from a current position of the vehicle to a parking target position; an inclination angle calculation unit configured to calculate first inclination angle information, which is information indicating an inclination angle with respect to the ground on which the vehicle travels, in a chronological order, calculate second inclination angle information by performing a filtering process of removing a high frequency component equal to or higher than a predetermined threshold value on waveform information represented by arranging a plurality of pieces of the calculated first inclination angle information in a chronological order, and when it is determined that there is a deviation between the first inclination angle information and the second inclination angle information based on a predetermined reference, reset the plurality of pieces of the first inclination angle information used in the filtering process and calculate the second inclination angle information by performing the filtering process using a plurality of pieces of the first inclination angle information calculated after the resetting; and a movement control unit configured to execute movement control for controlling a driving force and a braking force on the vehicle to move the vehicle to the parking target position along the movement route, while adjusting the driving force and the braking force according to the second inclination angle information.

According to the above-described program, for example, when it is determined that there is a deviation between the first inclination angle information and the second inclination angle information, the plurality of pieces of the first inclination angle information used in the filtering process are reset, so that the second inclination angle information calculated thereafter can follow the true value more quickly.

While embodiments and modifications disclosed here have been described, these embodiments and modifications have been presented by way of example only, and are not intended to limit the scope of this disclosure. Indeed, these novel embodiments and modifications described herein may be embodied in a variety of other forms. Furthermore, various omissions, substitutions and changes may be made without departing from the spirit of this disclosure. The accompanying claims and their equivalents are intended to cover such forms or modifications as would fall within the scope and spirit of this disclosure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance apparatus comprising:
an inclination angle calculation unit configured to calculate first inclination angle information, which is information indicating an inclination angle with respect to the ground on which the vehicle travels, in a chronological order, calculate second inclination angle information by performing a filtering process of removing a high frequency component equal to or higher than a predetermined threshold value on waveform information represented by arranging a plurality of pieces of the calculated first inclination angle information in a chronological order, and when it is determined that there is a deviation between the first inclination angle information and the second inclination angle information based on a predetermined reference, reset the plurality of pieces of the first inclination angle information used in the filtering process and calculate the second inclination angle information by performing the filtering process using a plurality of pieces of the first inclination angle information calculated after the resetting; and
a movement control unit configured to execute movement control for controlling a driving force and a braking force on the vehicle to move the vehicle to predetermined parking target position along a predetermined movement route, while adjusting the driving force and the braking force according to the second inclination angle information.

2. The parking assistance apparatus according to claim 1, wherein
when a time period in which it is determined that there is a deviation between the first inclination angle information and the second inclination angle information based on the predetermined reference continues for a predetermined time period or longer, the inclination angle calculation unit resets the plurality of pieces of the first inclination angle information used in the filtering process.

3. The parking assistance apparatus according to claim 1, wherein
when the inclination angle calculation unit resets the plurality of pieces of the first inclination angle information used in the filtering process, the movement control unit executes the movement control by using the first inclination angle information instead of the second inclination angle information until the inclination angle calculation unit starts calculating the second inclination angle information after the resetting.

4. The parking assistance apparatus according to claim 1, wherein
when the inclination angle calculation unit resets the plurality of pieces of the first inclination angle information used in the filtering process, immediately after the resetting, the movement control unit executes the movement control by using predetermined inclination angle information obtained based on the plurality of pieces of the first inclination angle information calculated by the inclination angle calculation unit immediately before the resetting.

5. A parking assistance method comprising:
an inclination angle calculation step of calculating first inclination angle information, which is information indicating an inclination angle with respect to the ground on which the vehicle travels, in a chronological order, calculating second inclination angle information by performing a filtering process of removing a high frequency component equal to or higher than a predetermined threshold value on waveform information represented by arranging a plurality of pieces of the calculated first inclination angle information in a chronological order, and when it is determined that there is a deviation between the first inclination angle information and the second inclination angle information based on a predetermined reference, resetting the plurality of pieces of the first inclination angle information used in the filtering process and calculating the second inclination angle information by performing the filtering process using a plurality of pieces of the first inclination angle information calculated after the resetting; and
a movement control step of executing movement control for controlling a driving force and a braking force on the vehicle to move the vehicle to a predetermined parking target position along a predetermined movement route, while adjusting the driving force and the braking force according to the second inclination angle information.

6. A non-transitory computer readable medium storing a program that causes a computer to function as:
an inclination angle calculation unit configured to calculate first inclination angle information, which is information indicating an inclination angle with respect to the ground on which the vehicle travels, in a chronological order, calculate second inclination angle information by performing a filtering process of removing a high frequency component equal to or higher than a predetermined threshold value on waveform information represented by arranging a plurality of pieces of the calculated first inclination angle information in a chronological order, and when it is determined that there is a deviation between the first inclination angle information and the second inclination angle information based on a predetermined reference, reset the plurality of pieces of the first inclination angle information used in the filtering process and calculate the second inclination angle information by performing the filtering process using a plurality of pieces of the first inclination angle information calculated after the resetting; and
a movement control unit configured to execute movement control for controlling a driving force and a braking force on the vehicle to move the vehicle to a predetermined parking target position along a predetermined movement route, while adjusting the driving force and the braking force according to the second inclination angle information.

* * * * *